United States Patent
Kraus et al.

(10) Patent No.: US 6,977,458 B2
(45) Date of Patent: Dec. 20, 2005

(54) DRIVE DEVICE

(75) Inventors: Thomas Kraus, Gauting (DE);
Bernhard Meier, Kirchheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 84 days.

(21) Appl. No.: 10/406,390

(22) Filed: Apr. 4, 2003

(65) Prior Publication Data

US 2003/0188490 A1    Oct. 9, 2003

(30) Foreign Application Priority Data

Apr. 4, 2002   (DE) ................................ 102 14 926

(51) Int. Cl.⁷ ............................................ H01R 39/38
(52) U.S. Cl. ........................ 310/239; 310/89; 310/71; 310/83
(58) Field of Search .............................. 310/71, 83, 89, 310/75 R, 238–247

(56) References Cited

U.S. PATENT DOCUMENTS

| | | | |
|---|---|---|---|
| 4,398,135 A * | 8/1983 | Busch et al. | 318/443 |
| 4,572,979 A * | 2/1986 | Haar et al. | 310/68 R |
| 5,159,221 A * | 10/1992 | Miyazaki et al. | 310/239 |
| 6,163,096 A * | 12/2000 | Michenfelder et al. | 310/239 |
| 6,201,326 B1 * | 3/2001 | Klappenbach et al. | 310/75 R |
| 6,452,297 B2 * | 9/2002 | Yamamoto et al. | 310/89 |
| 2002/0121151 A1 | 9/2002 | Kraus et al. | 327/112 |
| 2002/0163280 A1 * | 11/2002 | Nakajima et al. | 310/239 |
| 2003/0001448 A1 | 1/2003 | Kaeufl et al. | 310/91 |

FOREIGN PATENT DOCUMENTS

| | | |
|---|---|---|
| DE | 42 33 156 A1 | 4/1994 |
| DE | 198 05 185 A1 | 3/2001 |
| DE | 100 18 230 A1 | 9/2002 |
| DE | 100 06 320 A1 | 1/2003 |

* cited by examiner

*Primary Examiner*—Dang Le
(74) *Attorney, Agent, or Firm*—Nixon Peabody LLP; David S. Safran

(57) ABSTRACT

A drive device for moving the sliding roof of a motor vehicle is provided which includes an electric motor including an armature, a pole shaft and a brush system, gearing driven by the electric motor, and a circuit arrangement for triggering the electric motor. The electric motor is accommodated in a motor housing while the gearing and at least parts of the circuit arrangement are accommodated in a gear housing connected to the motor housing. The brush system is accommodated directly in the gear housing independently of the circuit arrangement and without the interposition of additional support elements.

12 Claims, 2 Drawing Sheets

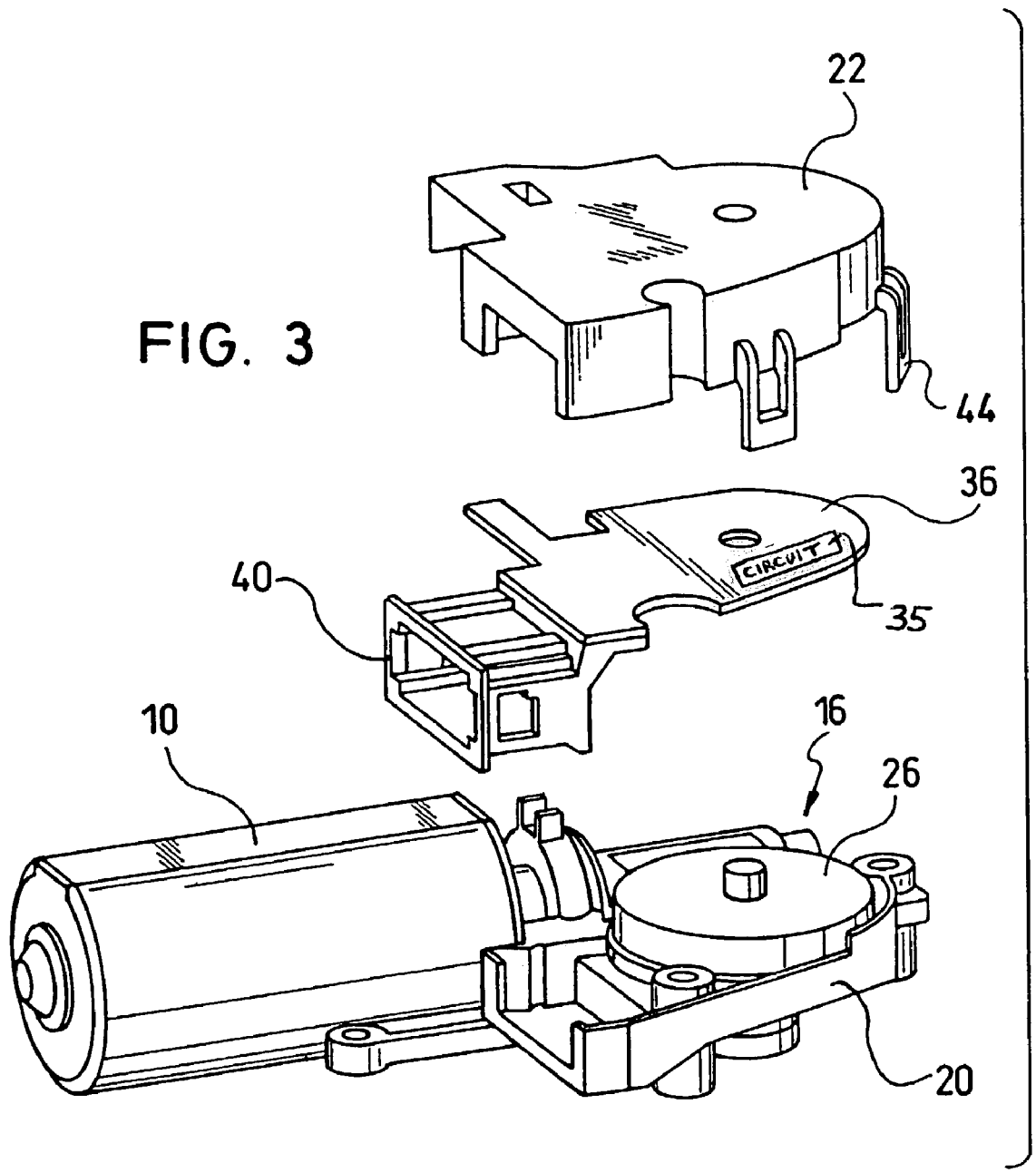

DRIVE DEVICE

BACKGROUND OF THE INVENTION

1. Field of the Invention

This invention relates to a drive device, especially for moving the sliding roof of a motor vehicle, which includes an electric motor comprising an armature, a pole shaft and a brush system, gearing driven by the electric motor, and a circuit arrangement for triggering the electric motor, wherein the electric motor is accommodated in a motor housing and the gearing and at least part of the circuit arrangement is accommodated in a gear housing connected to the motor housing.

2. Description of Related Art

One conventional drive device is disclosed in German Published Application No. 100 06 320. In this drive device, the gearing is accommodated in a gear housing which has a gear housing area and a circuit housing area. In one side wall of the circuit housing area there is an opening through which the pole shaft of the electric motor is inserted when the drive device is mounted. The brush system is housed in a brush bridge which is made as a peripheral plastic ring, which on its top has contact-making elements made as press-in contacts in order for the brush system to make contact with the circuit arrangement.

Another similar drive device is also disclosed in German Published Application No. 198 05 185 and corresponding U.S. Pat. No. 6,201,326. In this drive device, the brush system is mounted on a brush-holder support, on which, in addition to brush cartridges, there are also interference suppression coils.

Furthermore, German Published Application No. 100 18 230 discloses a similar drive device in which the brush system has a brush holder-support for holding the brushes and contact-making for the electrical contact with the motor electronics. The brush holder-support is a part which surrounds the pole shaft and which is located within the motor housing.

The disadvantage of the aforementioned drive devices is that the brush system must have its own holding devices which on the one hand mean additional parts and thus costs, and on the other also occupy a relatively large amount of space.

Finally, German Published Application No. 42 33 156 discloses a similar drive device in which, to acquire the rpm and direction of rotation of the electric motor near the pole shaft, there are Hall sensors which are located on a board aligned such that the pole shaft runs perpendicular to the board. In this drive device, the brush system is located on the side of the board facing away from the Hall sensors. The disadvantage in this approach is that, for exact positioning of the individual components, narrow tolerances must be maintained since the placement of the Hall sensors relative to the board, the placement of the brush system on the board and the placement of the board within the gear housing mutually influence one another.

SUMMARY OF THE INVENTION

The object of the present invention is to make available a drive device in which the individual components, and especially the brush system, can be prepared and joined together for the electric motor in a simple manner at low production and installation cost.

This object, and other objects, are achieved by providing a drive device having a brush system accommodated directly in the gear housing independently of the circuit arrangement and without the interposition of additional support elements. Specifically, the drive device of the present invention includes an electric motor including a pole shaft and a brush system, gearing driven by the electric motor, the circuit arrangement for triggering the electric motor, a motor housing containing the electric motor and a gear housing connected to the motor housing. The gear housing contains the gearing and at least part of the circuit arrangement. Support elements, as are known from the prior art, for example separate brush housing or brush holder, are superfluous, when, as in the present invention, the brush system is accommodated directly in the gear housing, for example in recesses which are designed for this purpose and which are made integrally with the gear housing. In this configuration of the drive device of the present invention, the positioning of the brush system is independent of the positioning of the circuit arrangement which can be placed in the gear housing without adhering to narrow tolerances.

In particular, the brush system can comprise at least two brush cartridges and the gear housing can have one receiver for each of the brush cartridges. Here the receivers and the brush cartridges are preferably made such that they can be connected to one another by means of an interference fit. The mounting of the drive device is then made extremely simple, since the brush system, after installation of the electric motor which has been done by connecting the motor housing and the gear housing, must be simply pressed into the receivers provided in the gear housing.

BRIEF DESCRIPTION OF THE DRAWINGS

FIG. 3 shows a perspective view which illustrates the mounting of the drive device of FIGS. 1 and 2.

DETAILED DESCRIPTION OF THE INVENTION

Figure 1:
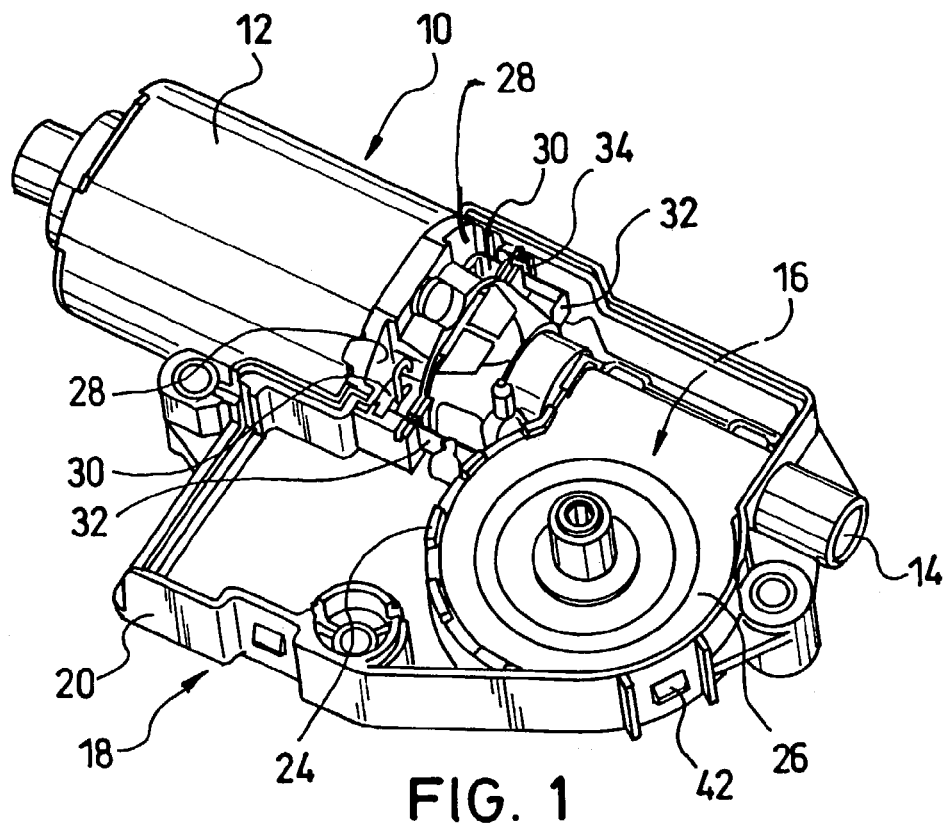
FIG. 1 shows a perspective view of the drive device of the present invention with the gear housing opened.
Figure 2:
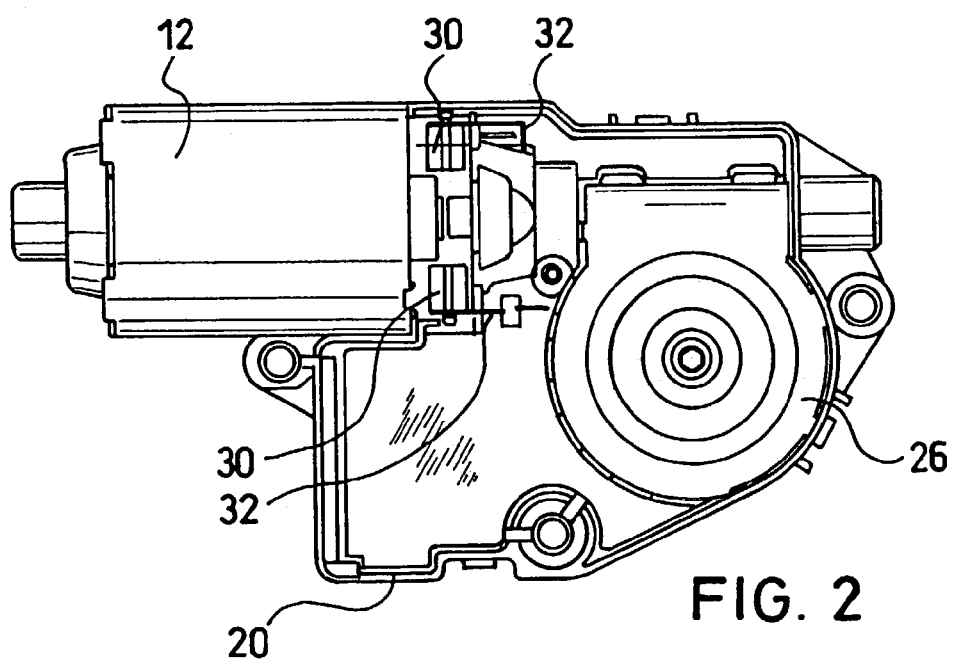
FIG. 2 shows a top view of the drive device of FIG. 1.

FIG. 1 shows an electric motor 10 including an armature (not shown) surrounded by a pole cup 12 which at the same time forms the motor housing. The force produced by the electric motor is delivered via the pole shaft 14 to the gearing including a worm wheel 16 which meshes with a worm shaft positioned in the front area of the pole shaft 14. The worm shaft can be connected to the pole shaft here or can be made in one piece with the motor shaft or pole shaft 14. The stepdown gearing formed in this way is used to drive an adjustable vehicle part, for example the cover element of an openable motor vehicle roof, and in particular, the cover of a sliding or sliding and lifting roof or a louver or louver combination of a louvered roof.

The gearing is accommodated in a gear housing 18 which, as best shown in FIG. 3, comprises a lower carrier area 20 and a housing cover 22 which are preferably made of plastic. The carrier 20 includes a bottom plate and a wall 24 (FIG. 1) which at least in part form the gear housing area in which the worm wheel 16 is located. The gear housing area and the section of the motor shaft which meshes with the worm wheel are closed by a cover 26 so that lubricant present in the gear housing area cannot emerge from this area into the remainder of the gear housing.

As shown in FIG. 1, on either side of the pole shaft, the carrier 20 of the gear housing has receivers 28 into which brush cartridges 30 are inserted. The brush cartridges in turn in the conventional manner contain sliding contacts, such as preferably carbon contacts, which are pressed against the pole shaft via compression springs. In order to connect the sliding contacts to a circuit arrangement 35 (FIG. 3) for triggering the motor, the brush cartridges furthermore comprise contact lugs 32 which are routed out of the receivers of the gear housing and sit in the recesses 34 thereof. The circuit arrangement 35 for triggering the electric motor is located on a board 36 which is located in the gear housing 18 in the installation of the drive device as shown in FIG. 3, such that it covers the worm wheel. On the board 36, the plug-in contacts, which are not shown in FIG. 3, provide for connection of the circuit board to the brush system via the contacts 32. The connection of the drive device to the vehicle electrical system then takes place via a plug-in contact, as is indicated in FIG. 3 at 40.

As is apparent from the figures, the structure and the installation of the drive device of the present invention are made extremely simple. In particular, the motor with the pole shaft is inserted into the receiver of the gear housing designed for this purpose and is connected to the gear housing. Then the worm wheel is inserted into the gear housing area and closed by means of the cover 16 of the gear housing area. Then the brush cartridges are inserted into the receivers 28 and preferably fixed there by means of an interference fit. The board 36, which contains the circuit arrangement 35 for triggering the electric motor, can be inserted either directly into the gear housing or locked first to the housing cover 22 and then seated jointly with the housing cover on the carrier 20. The cover 22 is fixed on the carrier 20 preferably via catch connections, for example catch projections 42, which are mounted on the carrier 20 (FIG. 1) and which lock with the corresponding catch projections 44 on the cover 22 (FIG. 3).

The drive device of the present invention is preferably used for adjustment of movable roof elements of a motor vehicle. The drive device of the present invention is formed with components which can be easily and quickly mounted and in which provisions are made for exact positioning of the parts against one another. In particular, the gear housing fixes the arrangement of the components since the positioning of the gearing, the motor and the brush system and the contact for making contact with the motor (via the brush system) all results from the holding devises for these components. These holding devices are provided for this purpose in the gear housing, especially the carrier.

We claim:

1. A drive device for moving the sliding roof of a motor vehicle, comprising:

an electric motor including a pole shaft and a brush system;

gearing driven by the electric motor;

a circuit arrangement for triggering the electric motor;

a motor housing containing the electric motor;

a gear housing connected to the motor housing, said gear housing having an interior space containing the gearing and at least part of the circuit arrangement, said brush system being positioned directly in the interior space of said gear housing independently of the circuit arrangement and without the interposition of additional support elements.

2. The drive device of claim 1, wherein the brush system comprises at least two brush cartridges and the gear housing includes a receiver for each of the brush cartridges.

3. The drive device of claim 2, wherein the receivers are located substantially perpendicular to a plane which contains the pole shaft and the gearing.

4. The drive device of claim 2, wherein the receivers and the brush cartridges are connected to one another by means of an interference fit.

5. The drive device of claims 2, wherein the receivers for the brush cartridges include recesses for holding contacts for the brush system to make contact with the circuit arrangement.

6. The drive device of claim 1, wherein the gear housing is made of plastic.

7. The drive device of claim 1, wherein the motor housing is formed by a pole cup of the electric motor.

8. The drive device of claim 1, wherein the gear housing includes a gear housing area which surrounds the gearing and the pole shaft, and a circuit housing area which holds the brush system and the circuit arrangement.

9. The drive device of claim 8, wherein the gear housing includes a carrier comprising the gear housing area and holding the brush system, and a housing cover.

10. The drive device of claim 8, wherein the gear housing area and the circuit housing area are separated from one another by means of a cover plate which closes the gear housing area.

11. The drive device of claim 1, wherein the gearing includes a worm wheel and at least part of the circuit arrangement is mounted on a board aligned substantially perpendicular to an axis of the worm wheel.

12. The drive device of claim 11, wherein the circuit arrangement is located at least partially within a contour of the worm wheel.

* * * * *